(12) United States Patent
Kong et al.

(10) Patent No.: US 11,908,107 B2
(45) Date of Patent: Feb. 20, 2024

(54) METHOD AND APPARATUS FOR PRESENTING IMAGE FOR VIRTUAL REALITY DEVICE, DEVICE AND NON-TRANSITORY COMPUTER-READABLE STORAGE MEDIUM

(71) Applicant: SANECHIPS TECHNOLOGY CO., LTD., Shenzhen (CN)

(72) Inventors: Dehui Kong, Shenzhen (CN); Ke Xu, Shenzhen (CN); Wei Yang, Shenzhen (CN); Jing You, Shenzhen (CN); Xin Liu, Shenzhen (CN); Jisong Ai, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 266 days.

(21) Appl. No.: 17/293,749

(22) PCT Filed: Nov. 13, 2019

(86) PCT No.: PCT/CN2019/118202
§ 371 (c)(1),
(2) Date: May 13, 2021

(87) PCT Pub. No.: WO2020/098721
PCT Pub. Date: May 22, 2020

(65) Prior Publication Data
US 2022/0122233 A1    Apr. 21, 2022

(30) Foreign Application Priority Data

Nov. 16, 2018  (CN) .......................... 201811368846.5

(51) Int. Cl.
*G06T 5/00* (2006.01)
*G06T 3/00* (2006.01)
*G06T 19/00* (2011.01)

(52) U.S. Cl.
CPC ............ *G06T 5/006* (2013.01); *G06T 3/0093* (2013.01); *G06T 19/006* (2013.01)

(58) Field of Classification Search
CPC ........ G02B 27/0172; G02B 2027/0178; G02B 2027/014; G02B 27/017; G02B 27/0093;
(Continued)

(56) References Cited

U.S. PATENT DOCUMENTS 6,317,127 B1 *  11/2001  Daily ...................... G06T 15/10
                                                    345/629
2006/0188172 A1    8/2006  Higurashi et al.
(Continued)

FOREIGN PATENT DOCUMENTS

CN        104567818 A    4/2015
CN        104735464 A    6/2015
(Continued)

OTHER PUBLICATIONS

International Search Report and Written Opinion for the International Patent Application No. PCT/CN2019/118202 dated Nov. 13, 2019.
(Continued)

*Primary Examiner* — Xiao M Wu
*Assistant Examiner* — Scott E Sonners
(74) *Attorney, Agent, or Firm* — Vivacqua Crane, PLLC

(57) ABSTRACT

Provided are a method and apparatus for presenting image for a VR device, a device and a non-transitory computer-readable storage medium. The method for presenting image for a VR device includes steps of: acquiring input image data; establishing a correspondence between the input image data and output image data in a polar coordinate system, the polar coordinate system having a pole which is an intersection of a center of a field of view of the VR device and a display plane; obtaining image data to be presented accord-
(Continued)

ing to the output image data; and presenting the image data to be presented on the basis of a convex lens.

13 Claims, 4 Drawing Sheets

(58) Field of Classification Search
CPC .......... G02B 2027/0123; G06T 19/006; G06T 15/10; G06T 5/002; G06T 2207/10021; G06T 5/003; G06T 5/006; G06T 3/0093; G06T 3/0018; G06T 15/20; G06T 7/60; G06T 3/40; G06T 3/005; G06T 11/00; G06T 7/30; G06T 3/0056; G06T 11/006; G06T 2210/44; G06T 7/64; G06F 3/011; G06F 3/013; H04N 23/698; H04N 13/344; H04N 13/383; H04N 13/239; H04N 13/117; H04N 13/366; G06V 40/193; G06V 20/20

See application file for complete search history.

(56) References Cited

U.S. PATENT DOCUMENTS

| | | |
|---|---|---|
| 2013/0236067 A1 | 9/2013 | Savvides et al. |
| 2015/0009416 A1 | 1/2015 | Tamayama et al. |
| 2017/0124980 A1* | 5/2017 | Gossett .................. G09G 5/003 |
| 2017/0206689 A1* | 7/2017 | Eo .......................... G06T 3/4007 |
| 2019/0156466 A1* | 5/2019 | Cho ........................ G06F 1/169 |
| 2019/0279427 A1* | 9/2019 | Tang ........................ G06T 1/20 |

FOREIGN PATENT DOCUMENTS

| | | | | |
|---|---|---|---|---|
| CN | 107206692 A | | 9/2017 | |
| CN | 107369132 A | * | 11/2017 | ............. G06T 3/604 |
| CN | 107369132 A | | 11/2017 | |
| CN | 108364623 A | | 8/2018 | |
| CN | 108427595 A | | 8/2018 | |

OTHER PUBLICATIONS

The State Intellectual Property Office of People's Republic of China. First Office Action for CN Application No. 2018113688465 and English translation, dated Aug. 17, 2023, pp. 1-10.

The State Intellectual Property Office of People's Republic of China. First Search Report for CN Application No. 2018113688465 and English translation, dated Aug. 14, 2023, pp. 1-6.

* cited by examiner

METHOD AND APPARATUS FOR PRESENTING IMAGE FOR VIRTUAL REALITY DEVICE, DEVICE AND NON-TRANSITORY COMPUTER-READABLE STORAGE MEDIUM

CROSS-REFERENCE TO RELATED APPLICATION

This application is a national stage filing under 35 U.S.C. § 371 of international application No. PCT/CN2019/118202, filed Nov. 13, 2019, which claims priority to Chinese patent application No. 201811368846.5, filed Nov. 16, 2018. The contents of these applications are incorporated herein by reference in their entirety.

TECHNICAL FIELD

Embodiments of the present disclosure relate to the field of Virtual Reality (VR), for example, a method and apparatus for presenting image for a VR device, a device, and a non-transitory computer-readable storage medium, which can perform Geometric Distortion Correction (GDC) for a display system of a VR Head Mount Device (HMD).

BACKGROUND

The VR technology builds realistic scenes with the help of a near-field display system, allowing a user to experience a large space in a small range. For this purpose, it is particularly important to build a realistic and efficient near-field display system. To get rid of the limitation of time and space, the VR technology has been widely used in, for example telemedicine, education and training, industrial simulation and so on. A VR system is consisted of a source generation end, a data processing end and a data presentation end. The source generation end is realized by an action camera or model composition based on a Graphics Processing Unit (GPU), the data processing end is configured to realize data splicing, transmission and extraction, and the data presentation end is configured to present the extracted content to a user.

The data presentation end is a module closely connecting the user and content, directly and greatly influencing the user experience. How to reduce distortion, for example, the distortion introduced by the HMD, at the data presentation end is an urgent problem to be solved.

SUMMARY

In embodiments of the present disclosure provided are a method and apparatus for presenting image for a VR device, and a device and a non-transitory computer-readable storage medium, capable of reduce distortion at a data presentation end of the VR device.

According to an embodiment of the present disclosure, a method for presenting image for a VR device is provided, and may include steps of:
  acquiring input image data;
  establishing a correspondence between the input image data and output image data in a polar coordinate system, the polar coordinate system having a pole which is an intersection of a center of a field of view of the VR device and a display plane;
  obtaining image data to be presented according to the output image data; and
  presenting the image data to be presented on the basis of a convex lens.

According to another embodiment of the present disclosure, an apparatus for presenting image for a VR device is provided, and may include:
  an acquisition module, configured to acquire input image data;
  a processing module, configured to establish a correspondence between the input image data and output image data in a polar coordinate system, and obtain image data to be presented according to the output image data, where the polar coordinate system has a pole which is an intersection of a center of a field of view of the VR device and a display plane; and
  a presentation module, configured to present the image data to be presented on the basis of a convex lens.

According to yet another embodiment of the present disclosure, a device for presenting image for a VR device is provided, and may include a processor and a memory for storing a computer program executable by the processor, where the computer program, when executed by the processor, causes the processor to perform the method described above.

According to yet another embodiment of the present disclosure, a VR device is provided. The VR device may include the apparatus described above or the device described above, and further includes a source generation end and a data processing end.

According to yet another embodiment of the present disclosure, a non-transitory computer-readable storage medium is provided. The non-transitory computer-readable storage medium stores a computer program which, when executed by a processor, causes the processor to perform the method described above.

DETAILED DESCRIPTION

The present disclosure will be described by embodiments with reference to the accompanying drawings. The embodiments described herein are merely intended to describe the disclosure and are not intended to limit the disclosure.

Image presentation can be achieved by a convex lens group in an HMD, in VR devices, that is, image data to be presented can be presented by the device on the basis of the convex lens located at the data presentation end. The convex lens group in the HMD is configured to increase the depth of field of the content to be presented, the use of the convex lens group may reduce the discomfort of users in near-field viewing, but may lead to a series of Graphic Distortions (GD) at the same time. The convex lenses in the HMD are centrosymmetric with a focus as their center. In an actual implementation, the input image data may be received by the data presentation end of the VR device, the input image data is the data processed by a source generation end and a data processing end of the VR device. In some embodiments, the input image data may be rectangular image data, for example, with a resolution of A*B, where A represents the number of horizontal pixels in the input image data and B represents the number of vertical pixels in the input image data. In a practical application, the input image data may be processed and presented by the data presentation end of the VR device.

In existing technologies, at the data presentation end of VR device the problems in two aspects should be solved: 1) how to reduce the distortions introduced by the HMD; and 2) how to make the model flexibly adapt to a variety of devices. The purpose of solving the problem in the first aspect is to improve the authenticity of the content viewed by users. The purpose of solving the problem in the second aspect is to reduce the dependence of distortion correction on resolutions and devices through modeling.

Based on the content described above, the following embodiments are provided.

Embodiment I

The embodiment of the present disclosure proposes a method for presenting image for a VR device, applicable to a data presentation end of a VR device.

Figure 1:
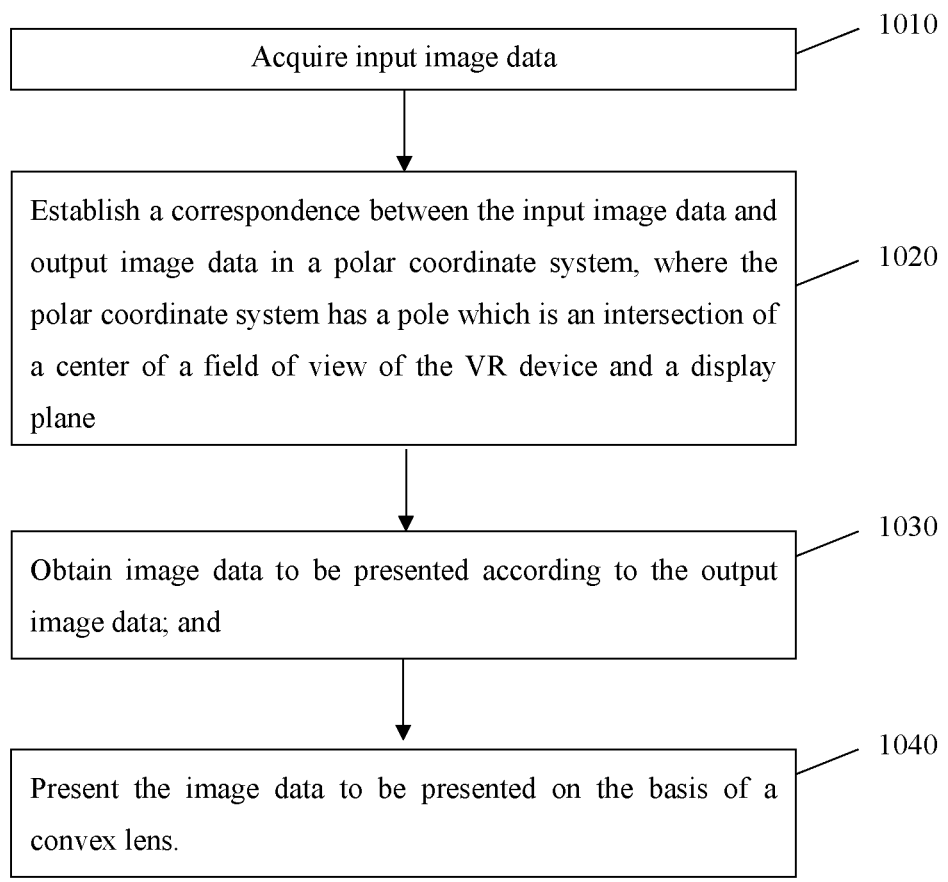
FIG. 1 is a flowchart of an method for presenting image for a VR device provided by an embodiment of the present disclosure.

FIG. 1 is a flowchart of an method for presenting image for a VR device according to an embodiment of the present disclosure. As shown in FIG. 1, the flow may include steps S1010 to S1040.

At step S1010, input image data is acquired.

In an embodiment, the input image data includes coordinates and pixel values of a plurality of pixels. The pixel value is used to represent a luminance component or a chrominance component of a pixel. For example, the pixel value may include a R component, a G component or a B component in a Red Green Blue (RGB) space, and may also include a Y component, a Cb component or a Cr component in a YCbCr space.

At step 1020, a correspondence between the input image data and output image data is established in a polar coordinate system, the pole of the polar coordinate system is an intersection of the center of the field of view of the VR device and a display plane.

In practical application, the output image data may be obtained according to the input image data and the correspondence between the input image data and the output image data. Regarding the image distortion caused by the data presentation end of the VR device, the technical scheme to realize GDC may be to perform pre-distortion processing on the input image data. The pre-distortion processing will be explained below.

The distortion caused by the convex lens located at the data presentation end may be explained by equation (1):

$$f(x,y) \xrightarrow{\text{HMD}} f'(x,y) \qquad (1)$$

In equation (1), HMD represents a mapping mode of the convex lens, f(x,y) represents a result output by the data processing end, i.e., a pixel value of a pixel with Cartesian coordinates (x,y) output by the data processing end; f(x,y) is consistent with the content in an actual scene in size, position, color and shape; f'(x,y) represents the content presented by the convex lens.

In an embodiment, the farther the area away from the center of the convex lens is, the more obvious the zooming-in effect is. This non-uniform distortion changes the relative size and position of an object, and a noticeable halo occurs at the edge of the object because of different distortions of different colors. On the other hand, the difficulty of numerical quantification is increased.

The non-uniform distortion caused by the convex lens may be suppressed by the distortion suppression mode shown in equation (2):

$$f(x,y) \xrightarrow{\text{HMD'}} g(x,y) \xrightarrow{\text{HMD}} f(x,y) \qquad (2).$$

In equation (2), HMD' represents pre-distortion processing. It can be seen that the result f(x, y) output by the data processing end is not directly displayed (i.e., not directly presented through the convex lens), but is pre-distorted, and a pre-distorted result g(x,y) is displayed (i.e., presented through the convex lens). In an embodiment, HMD' represents inverse mapping of HMD. In an embodiment, when HMD represents a mapping mode corresponding to barrel distortion, HMD' represents a mapping mode corresponding to pincushion distortion, and when HMD represents a mapping mode corresponding to pincushion distortion, HMD' represents a mapping mode corresponding to barrel distortion.

In an embodiment of the present disclosure, HMD' represents a mapping mode from the input image data to the output image data (used for representing a relationship of mapping from a plurality of pixels in the input image data to a plurality of pixels in the output image data).

As an implementation of this step, the coordinates of each of the plurality of pixels in the input image data may be mapped in a specific mapping mode in the polar coordinate system to obtain output image data. The specific mapping mode is used for representing an inverse mapping of an image zooming-in mapping mode of the convex lens.

In order to determine the specific mapping mode, there is a need to determine the image zooming-in mapping mode of the convex lens. In an actual implementation, parameters (including distortion parameters) of the convex lens may be pre-determined and stored, and retrieved later. According to the parameters of the convex lens, the image zooming-in mapping mode of the convex lens can be determined, and then the inverse mapping mode of the image zooming-in mapping mode of the convex lens can be determined, that is, the specific mapping mode can be determined.

Referring to equation (1) and equation (2), in existing technologies, for the non-uniform distortion caused by the convex lens, a distortion suppression scheme in the Cartesian coordinate system is used in most cases. In the Cartesian coordinate system, two or more number axes are intersected at the origin to form a planar radial coordinate system, including a rectangular coordinate system and an oblique coordinate system. A commonly used Cartesian coordinate system is the rectangular coordinate system. In a plane, any point can be positioned by coordinates of corresponding points on the number axes. The directions of the number axes are taken as unit directions, and the distances from the points on the number axes to the origin in the directions are expressed by unit lengths. The distance from the point to the origin are calculated by square and square root.

In an embodiment of the present disclosure, a distortion suppression scheme in the polar coordinate system may be used. In the polar coordinate system, the position of a reference point is described through a distance (called polar diameter ρ) between the reference point and the origin and an included angle (called polar angle θ) between the connection line between the reference point and the origin and the horizontal line. When ρ is limited to be greater than or equal to zero and θ to be between 0 and 2π, every point in the plane except the pole has a unique polar coordinate description (ρ, θ).

A conversion relationship between the polar coordinates and the Cartesian rectangular coordinates will be explained by equation (3) and equation (4):

$$\rho = \sqrt{(x^2+y^2)}, \theta = \begin{cases} \arctan\frac{y}{x} & x > 0 \\ \pi + \arctan\frac{y}{x} & x < 0 \\ \frac{\pi}{2} & x = 0, y > 0 \\ \frac{3\pi}{2} & x = 0, y < 0 \end{cases} \quad (3)$$

$$x = \rho \cos\theta, y = \rho \sin\theta \quad (4)$$

The Cartesian coordinate system has the advantage of being intuitive and easy to understand, but the polar coordinate system has some advantages in modeling in practical calculation and is widely used in calculus. GD for a lens system has the characteristics of radial homogeneity, that is, deformations caused by the points having the same distance from the focus are the same. For the convex lens in the HMD, pre-distortion is equivalent to the zooming-out of an image to the focus, and for a rectangular image, a pincushion-like distortion is formed.

Based on the above description, in an embodiment, the coordinates of each of a plurality of pixels in the input image data are converted from the Cartesian coordinate system to the polar coordinate system prior to establishing a correspondence between the input image data and output image data. In an embodiment, the coordinates of each of the plurality of pixels in the input image data are converted from the Cartesian coordinate system to the polar coordinate system according to the display resolution of the VR device.

The display resolution of the VR device may be the display resolution of the HMD in the VR device. In an embodiment, the display resolution of the HMD in the VR device represents the resolution of data to be displayed, which may be the resolution of video source data or data plotted by a Graphics Processing Unit (GPU). In an example, the display resolution of the HMD may be the display resolution of the HMD corresponding to a monocular resolution, for example, when the output resolution of the HMD is 2560*1440, the display resolution of the HMD corresponding to the monocular resolution is 1280*1440. In another example, the display resolution of the HMD may be determined according to the aspect ratio of the input monocular resolution, for example, when the input monocular resolution is 1200*1200, the display resolution of the HMD is 1280*1208.

The display resolution of the VR device may be pre-determined and stored in the VR device, such that the display resolution of the VR device may be acquired by reading.

In the embodiments of the present disclosure, according to the display resolution of the VR device, the coordinates (x,y) of each of the plurality of pixels in the input image data in the Cartesian coordinate system can be calculated according to the coordinate conversion equation from the Cartesian coordinate system to the polar coordinate system to obtain corresponding polar coordinate data (ρ,θ), and then an image grid in the polar coordinate system is obtained.

In an embodiment, when calculating the polar coordinate data (ρ,θ), there is a need to acquire coordinates $(x_0,y_0)$ of the intersection of the center of the field of view of the VR device and the display plane in the Cartesian coordinate system. In a practical application, the coordinates of the intersection of the center of the field of view of the VR device and the display plane may be pre-determined and stored. In this way, the coordinates of the intersection of the center of the field of view of the VR device and the display plane may be acquired by reading.

In an embodiment, when the VR devices have the same display resolution, the coordinate conversion equation from the Cartesian coordinate system to the polar coordinate system can be the same, that is, for the same display resolution of the VR devices, a unified coordinate conversion equation from the Cartesian coordinate system to the polar coordinate system may be used.

In a practical application, in order to ensure that the data contents before and after coordinate conversion are consistent, and no input data is lost, the polar diameter of polar coordinate data after the coordinate conversion may be zoomed out to the range of (0,1).

The display resolution of the VR device may be expressed as m*n, where both m and n are greater than 1. The coordinate conversion equation from the Cartesian coordinate system to the polar coordinate system will be explained by equation (5):

$$\rho = 2\sqrt{\left(\left(\frac{x-x_0}{\max(m-x_0,x_0)}\right)^2 + \left(\frac{y-y_0}{\max(n-y_0,y_0)}\right)^2\right)}, \quad (5)$$

$$\theta = \begin{cases} \arctan\frac{y-y_0}{x-x_0}, & x-x_0 > 0 \\ \pi + \arctan\frac{y-y_0}{x-x_0}, & x-x_0 < 0 \\ \frac{\pi}{2}, & x-x_0 = 0, y-y_0 > 0 \\ \frac{3\pi}{2}, & x-x_0 = 0, y-y_0 < 0 \end{cases}$$

In a practical application, for any display resolution of the VR device, the coordinate conversion equation from the Cartesian coordinate system to the polar coordinate system may be expressed by a table. Coordinate system conversion tables corresponding to a plurality of display resolutions of the VR devices may be pre-determined, the tables are used to represent the coordinate mapping relationship of the plurality of pixels in the image from the Cartesian coordinate system to the polar coordinate system.

In an embodiment, the pre-determined Coordinate system conversion tables (Look-Up-Tables, LUTs) respectively corresponding to the plurality of display resolutions may be acquired. According to the display resolutions of the VR devices and the LUTs respectively corresponding to the plurality of display resolutions, the coordinates of the plurality of pixels in the input image data are respectively converted from the Cartesian coordinate system to the polar coordinate system.

In an embodiment, according to a display resolution of a VR device, a LUT corresponding to the display resolution of the VR device may be selected from the LUTs respectively corresponding to the plurality of display resolutions. According to the selected LUT, the coordinates of each of the plurality of pixels in the input image data are converted from the Cartesian coordinate system to the polar coordinate system.

In an embodiment, because a unified LUT can be used for the same display resolution of the VR devices, when different VR devices (e.g., different HMDs) have the same display resolution, the reuse of the unified LUT can provide ease to implementation in hardware design. Moreover, the dependence on VR device models or HMD models during the coordinate conversion is reduced, the defect of sensitivity to parameter setting of VR devices or HMDs in existing technology is overcome, the adaptation to different VR devices or different HMDs is facilitated, and the expandability of embodiments of the present disclosure is improved.

At step S1030, image data to be presented is obtained according to the output image data.

In an embodiment, the image data to be presented is presented through a convex lens group of the VR device, the image data to be presented includes coordinates and pixel values of a plurality of pixels.

In the embodiments of the present disclosure, the image data to be presented includes the image data obtained by determining the pixel values of the plurality of pixels in the output image data. The pixel values of the plurality of pixels in the output image data can be determined, and the image data to be presented can be obtained according to the coordinates and pixel values of the plurality of pixels in the output image data.

Determining the pixel values of the plurality of pixels in the output image data, for example, may be realized based on two mapping methods. The first is mapping from an input space to an output space, and the second is mapping from an output space to an input space. The two mapping methods will be explained separately below.

The first mapping method: mapping from an input space to an output space.

For the input image data, a polar coordinate pixel grid of the input space is generated, each of a plurality of grid in the polar coordinate pixel grid of the input space corresponding to a respective one of the plurality of pixels in the input image data. In an embodiment, the pixels corresponding to the polar coordinate pixel grid of the input space may not include all the pixels in the image corresponding to the input image data.

Pixels respectively corresponding to a plurality of grids in the polar coordinate pixel grid of the input space are mapped, according to a mapping mode from input image data to output image data, to obtain a plurality of discrete pixels mapped. According to the plurality of discrete pixels after mapping, a polar coordinate pixel grid of the output space is generated, each grid in the polar coordinate pixel grid of the output space corresponding to one pixel of the plurality of discrete pixels mapped. In an embodiment, the plurality of discrete pixels mapped are all located in the polar coordinate pixel grid of the output space. When the mapping mode from the input image data to the output image data is the above specific mapping mode, because the image zooming-in mapping of convex lens is a nonuniform zooming-in mapping, the specific mapping mode is a nonuniform zooming-out mapping mode. Thus, when the polar coordinate pixel grid of the input space is a uniformly distributed grid, the polar coordinate pixel grid of the output space is non-uniform.

In a practical application, the pixel value of each of the plurality of discrete pixels mapped can be determined. In an embodiment, the pixel value of each discrete pixel mapped is the pixel value of a corresponding pixel in the input image data in the polar coordinate pixel grid of the input space before mapping, that is, pixels in the polar coordinate pixel grid of the input space form a one-to-one correspondence with the discrete pixels mapped, and the pixel value of each discrete pixel mapped is the pixel value of a corresponding pixel in the polar coordinate pixel grid of the input space.

After the pixel value of each of the plurality of discrete pixels mapped is determined, the pixel value of each of the plurality of pixels in the polar coordinate pixel grid of the output space is determined.

When a pixel in the image corresponding to the output image data is not included in the pixels in the polar coordinate pixel grid of the output space, the pixel value of a corresponding pixel may be determined by interpolation operation. In an embodiment, a neighborhood of the pixel that does not belong to the polar coordinate pixel grid of the output space can be determined according to the polar coordinate pixel grid of the output space. Interpolation operation is performed on the pixel values of a plurality of pixels in the neighborhood of the pixel to obtain the pixel value of the pixel. For example, when i is a positive integer, if the $i^{th}$ pixel in the output image data is not included in the pixels in the polar coordinate pixel grid of the output space, a neighborhood of the $i^{th}$ pixel in the output image data can be determined in the polar coordinate pixel grid of the output space, and the interpolation operation is performed on the pixel values of a plurality of pixels in the neighborhood of the $i^{th}$ pixel in the output image data to obtain the pixel value of the $i^{th}$ pixel in the output image data.

In the embodiments of the present disclosure, when performing interpolation operation on the pixel values of the plurality of pixels in the neighborhood of the corresponding pixel, the pixel interpolation based on the polar coordinate system can be adopted. The interpolation based on a plurality of pixels is affected by two factors, one is the Tape number of queue set class libraries, that is, the number of pixels participating in interpolation, and the other is weight which is used to determine the influence of the pixels participating in interpolation on interpolation operation results. In an embodiment, the weight of each pixel is adjusted according to the Tape number. Here, the scheme of selecting the Tape number is consistent with that in the Cartesian coordinate system, that is, selecting a p×q neighborhood in a mapped pixel position, both P and q being integers greater than 1. As for the selection of pixel weights, the interpolation scheme in the polar coordinate system needs to consider the differences of the polar diameters and the polar angles. A pixel interpolation method in the polar coordinate system is illustrated by equation (6) below:

$$PixelOutput(\rho_1, \theta_0) = \sum_{i,j} \text{weight}_{i,j} \times PixelInput(\rho_i, \theta_j) \quad (6)$$

In equation (6), $(\rho_1, \theta_0)$ represents the coordinates of the pixel of which the pixel value needs to be obtained by interpolation operation, $(\rho_i,\theta_j)$ represents the coordinates of a pixel in the neighborhood of the pixel of which the pixel value needs to be obtained by interpolation operation, PixelOutput$(\rho_1,\theta_0)$ represents the pixel value of the pixel obtained by interpolation operation, PixelInput$(\rho_i,\theta_j)$ represents the pixel value of the pixel of which the coordinates are $(\rho_i,\theta_j)$, and weight$_{i,j}$ represents the normalized weight of the pixel of which the coordinates are $(\rho_i,\theta_j)$.

When realizing equation (6) by hardware, the sum of weights may be quantized to the power of 2, which may be realized by multiplying, adding and shifting operations. In this process, according to the distance between polar diameters and polar angles, the schemes of mapping weights may be different. Thus, the weights may be determined according to the differences of the polar diameters and the polar angles. Learning from the interpolation method in the Cartesian coordinate system, different interpolation methods (similar to bilinear interpolation and trilinear interpolation methods) based on the polar coordinate system may be introduced. In an actual implementation, an interpolation scheme similar to Lanczos may be used, or a bilinear interpolation method based on polar diameters and polar angles may be used.

In some embodiments, interpolation operation may be performed using the bilinear interpolation method, trilinear interpolation method or Lanczos interpolation method according to pixel values of the plurality of pixels in the neighborhood of the pixel.

When a pixel in the output image data is included in the pixels in the polar coordinate pixel grid of the output space, the pixel value of the pixel in the output image data can be directly determined as the pixel value of the corresponding pixel in the polar coordinate pixel grid of the output space. For example, when i is a positive integer, if the $i^{th}$ pixel in the output image data is included in the pixels in the polar coordinate pixel grid of the output space, the pixel value of the $i^{th}$ pixel in the output image data is the pixel value of a corresponding pixel in the polar coordinate pixel grid of the output space.

The first mapping method has the advantages that pixel information can be outputted more efficiently, and has the disadvantages that in some embodiments, there is a need to cache a large amount of data to ensure that all the pixels required for interpolation have been mapped, which increases the consumption of memory resources, for example, the consumption of Static Random-Access Memories (SRAM), in hardware design. In an embodiment, since the polar coordinate pixel grid after mapping is nonuniform, the points mapped in the same neighborhood are not exactly the same in number, and the design of interpolation weights more is complicated.

The Second Mapping Method: Mapping from an Output Space to an Input Space

For the input image data, a polar coordinate pixel grid of the input space is generated. In an embodiment, each grid in the polar coordinate pixel grid of the input space corresponding to one pixel in the input image data. In an embodiment, the pixels corresponding to the polar coordinate pixel grid of the input space may not include all the pixels in the image corresponding to the input image data.

According to the mapping mode from the output image data to the input image data, for example, the inverse mapping of the above specific mapping mode, a plurality of pixels in the image corresponding to the output image data are mapped to the polar coordinate pixel grid of the input space to obtain a plurality of discrete pixels mapped.

In an embodiment, a polar diameter may be remapped according to the parameters of the HMD, that is, each pixel in the output image data is mapped according to the mapping mode from the output image data to the input image data to obtain a mapped position $(\rho_1,\theta_0)$ of the pixel $(\rho_0,\theta_0)$ of the output image data in the polar coordinate pixel grid of the input space. According to the characteristics of the convex lens mapping mode, the distortion caused by this mode is symmetrical about the focus of the convex lens. Therefore, when the pole of the polar coordinate system is an intersection of the center of the field of view of the VR device and a display plane, the distortion caused by the convex lens mapping mode is only the radial distortion in the polar coordinate system. Thus, before and after remapping (the inverse mapping of the specific mapping mode), the coordinates of pixels only change in polar diameter, but not in polar angle. The remapping may be explained by equation (7):

$$\rho_i = h(\rho_0) \qquad (7)$$

In equation (7), h( ) represents a function corresponding to the mapping mode from the output image data to the input image data.

When a pixel of the plurality of discrete pixels mapped is not included in the pixels in the polar coordinate pixel grid of the input space, the pixel value of the pixel that does not belong to the polar coordinate pixel grid of the input space may be determined by interpolation operation. In an embodiment, a neighborhood of the pixel that does not belong to the polar coordinate pixel grid of the input space may be determined according to the polar coordinate pixel grid of the input space. Interpolation operation may be performed on the pixel values of a plurality of pixels in the neighborhood of the pixel to obtain the pixel value of the pixel. For example, when i is a positive integer, if the $i^{th}$ pixel of the plurality of discrete pixels mapped is not included in the pixels in the polar coordinate pixel grid of the input space, a neighborhood of the $i^{th}$ pixel of the plurality of discrete pixels mapped may be determined in the polar coordinate pixel grid of the input space, and interpolation operation may be performed on the pixel values of a plurality of pixels in the neighborhood of the $i^{th}$ pixel of the plurality of discrete pixels mapped to obtain the pixel value of the $i^{th}$ pixel of the plurality of discrete pixels mapped.

In an embodiment, the interpolation operation method is the same as the interpolation operation method in the first mapping method.

When a pixel of the plurality of discrete pixels mapped is included in the pixels in the polar coordinate pixel grid of the input space, the pixel value of the pixel of the plurality of discrete pixels mapped can be directly determined as the pixel value of a corresponding pixel in the polar coordinate pixel grid of the input space. For example, when i is a positive integer, if the $i^{th}$ pixel of the plurality of discrete pixels mapped is included in the pixels in the polar coordinate pixel grid of the input space, the pixel value of the $i^{th}$ pixel of the plurality of discrete pixels mapped is the pixel value of the corresponding pixel in the polar coordinate pixel grid of the input space.

After the pixel values of the plurality of discrete pixels mapped are determined, the pixel values of a plurality of pixels in the output image data can be obtained according to the pixel values of the plurality of discrete pixels mapped, that is, according to the mapping mode from the output image data to the input image data, all pixels before and after mapping have a one-to-one correspondence. At this time, the pixel value of each pixel in the output image data can be determined as the pixel value of a corresponding pixel of the plurality of discrete pixels mapped.

The second mapping method has the advantages that the input line buffer can be effectively reduced and all information about the input pixels can be fully used. In an embodiment, according to the second mapping method, the polar coordinates of the plurality of pixels in the output image data are mapped to the input space one by one respectively, since the polar coordinate pixel grid of the input space is uniform, each time a pixel is mapped, pixels participating in interpolation can be uniquely determined according to the mapping results and the neighborhood parameters. In another embodiment, compared with the first mapping method, there is no need to cache the mapping results of the plurality of pixels, and then the input line buffer may be effectively reduced.

The second mapping method has the potential defect that when the pixels are mapped to the polar coordinate pixel grid of the input space, the intervals between the plurality of discrete pixels mapped are not uniform. However, the neighborhood range selected for the plurality of discrete pixels mapped simultaneously cannot include all the pixels in the polar coordinate pixel grid of the input space, and thus some pixels in the polar coordinate pixel grid of the input space may not participate in the interpolation, leading to the omission of input image data information. This defect can be weakened by increasing the Tape number of the interpolation, but the increase in the Tape number will lead to an increase in the complexity of interpolation. This defect may be obvious when the distortion difference between adjacent output pixels is large (for example, the effective edge area with lower output resolution). However, with the continuous improvement of display resolution, the defect is no longer obvious (when the input and output display resolutions are guaranteed to be above 2K, the defect is indistinguishable by naked eyes). Therefore, the second mapping method is usually used for mapping in the embodiments of the present disclosure.

No matter which mapping method is adopted, when the mapping mode from the input image data to the output image data is the specific mapping mode above, because the image content is zoomed-in by the convex lens, the same image content will be zoomed-out by the inverse mapping of the convex lens mapping mode. Therefore, compared with the image area (for example, rectangular area) before mapping according to the specific mapping mode, the image area mapped according to the specific mapping method may have some black edges (such as black edges caused by pincushion distortion). It may be judged whether the pixels in the image area mapped according to the specific mapping method involve input signals (that is, whether mapped from the pixels in the input image data), and processing is performed according to the judgment result. In an embodiment, when the judgment result is yes, the pixel values of the pixels may be set to zero.

In an embodiment, the area where the plurality of pixels in the image corresponding to the output image data are located may be removed from the area where the plurality of pixels in the image corresponding to the input image data are located, to obtain an edge pixel area. The pixel values of a plurality of pixels in the edge pixel area are set to zero, and the image data to be presented is generated according to the coordinates and pixel values of the plurality of pixels in the output image data and the coordinates and pixel values of the plurality of pixels in the edge pixel area.

At step S1040, the image data to be presented is presented on the basis of a convex lens.

In some embodiments of the present disclosure provided are a method and apparatus for presenting image for a VR device, and a device and a non-transitory computer-readable storage medium. The method includes: acquiring input image data; establishing a correspondence between the input image data and output image data in a polar coordinate system, where the polar coordinate system has a pole which is an intersection of a center of a field of view of the VR device and a display plane; obtaining image data to be presented according to the output image data; and presenting the image data to be presented on the basis of a convex lens. In this way, since both the center of the field of view and the focus of the convex lens are located on a main optical axis of the convex lens, when the convex lens mapping mode has the characteristic of central symmetry about the focus, the convex lens mapping mode has the characteristic of central symmetry about the pole. Furthermore, in some embodiments of the present disclosure, mapping results can be obtained only by polar diameter mapping in the polar coordinate system without polar angle mapping. The calculation complexity is lower than that of the mapping mode in the Cartesian coordinate system, facilitating hardware implementation.

In a practical application, steps S1010 to S1030 may be implemented by a processor of the VR device and the processor may be located at the data presentation end of the VR device. Step S1040 may be implemented by the processor of the VR device in combination with the hardware device at the data presentation end, and the processor may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller and a microprocessor.

In an embodiment of the present disclosure, for the GD introduced by the data presentation end of the VR device, the coordinate mapping scheme is transferred from the Cartesian coordinate system to the polar coordinate system, so the effect of GDC can be improved. In an embodiment of the present disclosure, the coordinate data $(\rho,\theta)$ of each pixel in the input image data in the polar coordinate system is acquired, a plurality of pixels in the input image data are mapped according to a specific mapping mode (polar mapping) to obtain output image data, and the coordinate data of each of the pixels in the output image data is written as $(\rho',\theta)$. According to the characteristics of the convex lens mapping mode in the HMD, a polar angle is not corrected in the mapping process of the above specific mapping mode. When the pixels in the image area mapped according to the above specific mapping mode do not involve input signals, the pixel values of the corresponding pixels are set to zero, that is, zero padding is performed. When the pixels in the image area mapped according to a specific mapping mode are mapped according to the above specific mapping method, the pixel values of corresponding pixels may be obtained by interpolation operation, and the luminance or chrominance result $f(\rho',\theta)$ of a pixel to be presented may be obtained.

Compared with the GDC scheme in the Cartesian coordinate system used in the related technology, the method in the embodiments of the present disclosure has the advantages that the distance $r=\sqrt{(x^2+y^2)}$ from a pixel to the focus is not calculated, and the distance reallocation of the pixels in the coordinate system is not performed according to the following equation:

$$x' = r' \times \cos\left(\arctan\left(\frac{y}{x}\right)\right), x' = r' \times \sin\left(\arctan\left(\frac{y}{x}\right)\right),$$

where r' represents the polar diameter after mapping according to the convex lens mapping mode. The two sets of operations are also not suitable for hardware implementation. In contrast, in embodiments of the present disclosure, two sets of operations are not performed, and then the calculation complexity during image presentation of the VR device can be reduced.

In addition, because such radial distortion caused by the convex lens takes the focus as the center, the interpolation in the Cartesian coordinate system uses a relative position of the reference point to the center, and the interpolation in the polar coordinate system uses the polar diameter and polar angle information of the reference point and the point to be interpolated, which has a higher degree of fit to the distortion model. Thus, the effect of GDC can be improved.

In the embodiments of the present disclosure, in order to overcome the problem of high calculation complexity in the GDC method in the existing technologies and the defect of being sensitive to the parameter setting of the HMD device, a GDC scheme based on the polar coordinate system is provided. By completing distance mapping pixel by pixel in the polar coordinate system, unlike the block-based mapping scheme in the related technology, according to the present disclosure all the pixels of the input image data are mapped by the position coordinates of the input space and the output space, that is, the accuracy of each pixel can be very high. However, in the block-based mapping scheme according to the existing technologies, except for the high accuracy of boundary points, the accuracy of other points decreases with the increase in distance from the points and the boundary. Moreover, since the distortion of the convex lens involved in the embodiments of the present disclosure is non-uniform, the block-based processing has obvious distortion in some scenes with obvious linear characteristics. Meanwhile, in the embodiments of the present disclosure only polar diameter mapping is involved, such that the calculation complexity is lower than that of the scheme in the Cartesian coordinate system. In addition, by establishing the LUT transformation relationship between the polar coordinate system and the Cartesian coordinate system, it is very easy to implement in the hardware design. With the help of polar diameter and polar angle parameters, the interpolation operation in the polar coordinate system is implemented to obtain an output result, and the sensitivity of the distance mapping to the parameters is reduced, so the accuracy of interpolation can be improved.

The effects brought by the embodiments of the present disclosure will be described below with reference to the drawings.

Figure 2:
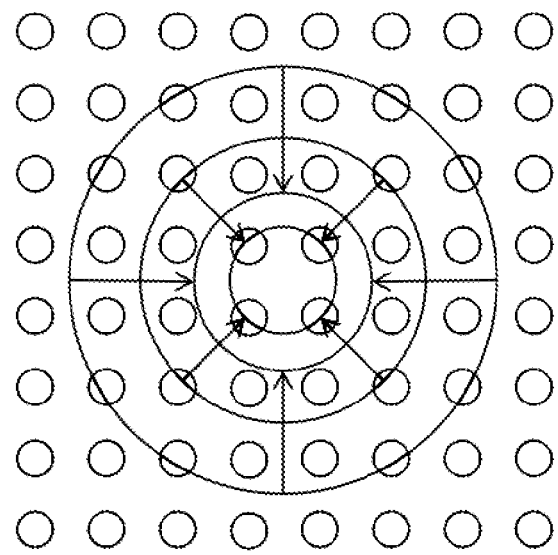
FIG. 2 is a schematic diagram of a model of geometric distortion of a convex lens according to an embodiment of the present disclosure.

FIG. 2 is a schematic diagram of a model of geometric distortion of a convex lens according to an embodiment of the present disclosure. In FIG. 2, the small circles represent the pixels of the input image data, and the large circles represent the distortions corresponding to the pixels respectively caused by the convex lens mapping mode. Referring to FIG. 2, the central position represents the position of the focus of the convex lens. It can be seen that the degree of distortion depends on the distance between the pixel and the focus, and the distance just corresponds to the polar diameter in the polar coordinate system.

Figure 3:
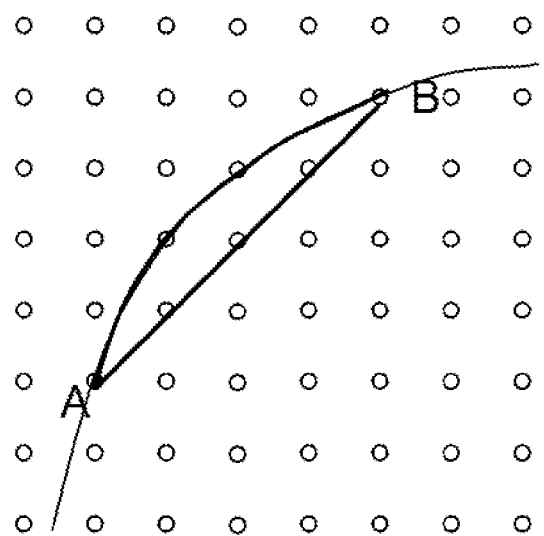
FIG. 3 is a schematic diagram showing differences between a polar coordinate system and a Cartesian coordinate system according to an embodiment of the present disclosure.

FIG. 3 is a schematic diagram showing differences between the polar coordinate system and the Cartesian coordinate system according to an embodiment of the present disclosure. As shown in FIG. 3, the small circles represent the pixels. In the polar coordinate system, two pixels A and B have the same polar diameters, but different polar angles. In the Cartesian coordinate system, the weights for the interpolation operation depend on the distances between the two pixels in a x direction and a y direction, as shown by a line segment AB in the figure. However, in the polar coordinate system, the weights for the interpolation operation depend on the differences of the pixels in the polar diameter and the polar angle. When the polar diameters of the pixels are the same, the distance between the pixels in the polar angle is not directly equal to its Euclidean distance. Similarly, in the polar coordinate system and the Cartesian coordinate system, even the Euclidean distances to the reference point are the same, the distortion degrees may be different. Therefore, the GDC scheme in the polar coordinate system is more in line with the distortion principle of the HMD, and the sensitivity to the parameters of the HMD may be reduced by using the polar coordinate grid calculated only once.

Embodiment II

Based on some embodiments of the present disclosure, an example is given for illustration.

A coordinate grid of the input space and a coordinate grid of the output space are established for the display resolution of the VR device. The coordinate grid of the input space and the coordinate grid of the output space are represented by the polar coordinates with a polar diameter in the range of [0, 1] and a polar angle in the range of [0, 2π]. For the HMD, a display resolution (i.e. output resolution) is fixed. Therefore, two LUTs may be set to establish the coordinate grid of the input space and the coordinate grid of the output space, respectively. By performing coordinate mapping in the polar coordinate system, the coordinate calculation complexity of each frame of image can be reduced to O(1).

According to the first mapping method described above, the pixels corresponding to the plurality of grids of the polar coordinate pixel grid of the input space may be mapped to obtain a plurality of discrete pixels mapped. According to the positions of the plurality of discrete pixels mapped in the polar coordinate grid of the output space, the weights are assigned according to the interpolation method based on the polar coordinate system (using the polar coordinate interpolation weight allocation method based on bilinear interpolation), and after the weights are assigned for the plurality of discrete pixels mapped, the interpolation operation results (i.e., pixel values) of the plurality of discrete pixels mapped are outputted in a way of weighted sum.

Figure 4:
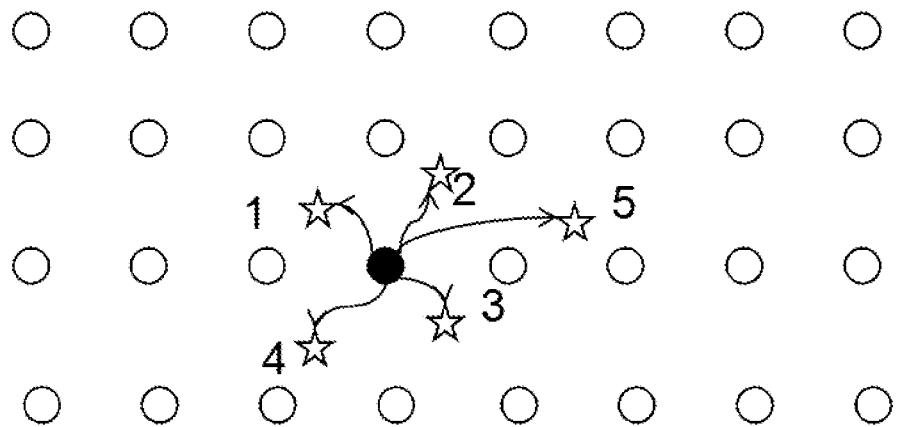
FIG. 4 is a schematic diagram of a mapping method from an input space to an output space in an embodiment of the present disclosure.

FIG. 4 is a schematic diagram of a mapping method from the input space to the output space in an embodiment of the present disclosure. As shown in FIG. 4, the circles represent the polar coordinate pixel grid of the input space, and the five-pointed stars represent the plurality of discrete pixels mapped. In FIG. 4, numerals 1 to 5 respectively represent five different pixels mapped. In an embodiment, the plurality of discrete pixels mapped are non-uniform relative to the polar coordinate pixel grid of the input space, and a pixel (represented by a solid circle) of the input space, which is determined by the polar diameter and the polar angle, may have weight influence (represented by a curve with an arrow in FIG. 4) on the surrounding five different discrete pixels. In FIG. 4, the curve with an arrow indicates that the pixel of the input space allocates weights to the plurality of discrete pixels mapped. When using the mapping method from the input space to the output space, the luminance components or chrominance components are shifted into corresponding polar coordinate positions, and the interpolation is performed according to the differences of the polar diameters and the polar angles shifted, the processing is described through the following steps.

A1: Generation of Polar Coordinate Pixel Grid

The display resolution of the HMD, the distortion parameters of the convex lens, the focus information, and the resolution of the source to be displayed are read.

In an embodiment, the focus information is used to characterize the center point of the field of view, usually corresponding to a pixel of the display resolution. The center of a monocular area is set as the center point by default. Here, the depth of field of a 3D video may be corrected by adjusting the focus to adapt to the pupil distance of the user.

The coordinate conversion is performed on the coordinates of the input image data according to equation (5) to obtain the coordinates of each of a plurality of pixels in the input image data in the polar coordinate system. Here, the maximum polar diameter in the polar coordinate system is 1, ensuring that all information in the input space can be projected into the output space.

B1: GDC Mapping Pixel by Pixel

In an embodiment, GDC mapping may be performed by using the first mapping method described above. The polar coordinate mapping from input space to output space is performed by using GDC parameters. When the polar coordinate mapping from input space to output space is performed, the polar angle information about each pixel is retained and the polar diameter information is corrected.

After the pixel values of all the pixels participating in the weight allocation of interpolation operation are counted, an operation result is outputted according to equation (8):

$$x_{output} = \left(x_N \text{weight}_N + \sum_{j=1:N-1} x_j \text{weight}_j\right) \bigg/ \sum_{q=1:N} \text{weight}_q. \quad (8)$$

In equation (8), $x_N$ represents the $N^{th}$ pixel participating in interpolation, $x_j$ represents the $j^{th}$ pixel participating in interpolation, the value of j being 1 to N, N being an integer greater than 1; $\text{weight}_N$ represents the weight of the $N^{th}$ pixel participating in interpolation, $\text{weight}_j$ represents the weight of the $j^{th}$ pixel participating in interpolation, $\Sigma \text{weight}_q$ represents the sum of weights of all pixels participating in interpolation, and $x_{output}$ represents an interpolation operation result.

In the embodiments of the present disclosure, after N pixels participate in the interpolation, the interpolation is stopped and the operation result is outputted.

C1: Pixel Interpolation in Polar Coordinate System

According to the description of the embodiments of the present disclosure, no matter which mapping method is adopted, the interpolation operation is performed for pixels. The interpolation method based on the polar coordinate system is characterized in that the weight design depends on the relative relationship of the polar coordinate space, and needs to meet the requirement that the weight of a point with a small distance is not less than that of a point with a large distance. Referring to the weight acquisition method in the Cartesian coordinate system, an implementation scheme is given as follows.

Based on the weight design of the linear relationship which is 2Tape in both horizontal direction and vertical direction, for the two pixels $(\rho_0,\theta_0)$ and $(\rho_1,\theta_1)$ in the polar coordinate system, when the polar diameters are the same $(\rho_0=\rho_1)$, the distance between the two pixels is $\text{dis}=\text{abs}(\theta_0-\theta_1)\times\rho_0$. When the polar angles are the same $(\theta_0=\theta_1)$, the distance between the two pixels is $\text{dis}=\text{abs}(\rho_0-\rho_1)$. When the polar diameters and the polar angles are both not equal, the distance between the two pixels is $\text{dis}=\text{abs}(\theta_0-\theta_1)\times\max(\rho_0,\rho_1)+\text{abs}(\rho_0-\rho_1)$. The sum $$DIS = \sum_{i=1:N} \frac{1}{dis_i}$$

of distances between the plurality of pixels participating in interpolation and the pixel of which the pixel value needs to be obtained by interpolation operation is calculated, where $dis_i$ represents the distance between the $i^{th}$ pixels participating in interpolation and the pixel of which the pixel value needs to be obtained by interpolation operation, the weight of the pixel participating in interpolation may be expressed by equation (9):

$$\text{weight} = \begin{cases} \frac{1}{DIS} \times \frac{1}{\text{abs}(\theta_0 - \theta_1) \times \rho_0}, & \rho_0 = \rho_1 \\ \frac{1}{DIS} \times \frac{1}{\text{abs}(\rho_0 - \rho_1)}, & \theta_0 = \theta_1 \\ \frac{1}{DIS} \times \frac{1}{(\text{abs}(\theta_0 - \theta_1) \times \max(\rho_0, \rho_1) + \text{abs}(\rho_0 - \rho_1))}, & \text{Other} \end{cases} \quad (9)$$

In an embodiment, according to the GDC parameter difference of different color channels, steps B1 and C1 may be performed pixel by pixel for each color channel, such that the output results can suppress color distortion at the same time.

Embodiment III

Based on some embodiments of the present disclosure, an example is given for illustration.

A coordinate grid of the input space and a coordinate grid of the output space are established for the display resolution of the VR device. The coordinate grid of the input space and the coordinate grid of the output space are represented by polar coordinates with a polar diameter in the range of [0, 1] and a polar angle in the range of [0, $2\pi$]. For the HMD, a display resolution (i.e. output resolution) is fixed usually. Therefore, two LUTs may be set to establish the coordinate grid of the input space and the coordinate grid of the output space respectively. Exemplarily, the coordinates of each LUT represent x, y coordinates of the Cartesian coordinate system, and the values represent polar diameters or polar angles.

According to the second mapping method described above, and according to the inverse mapping of the specific mapping mode (i.e., the image zooming-in mapping mode of the convex lens), each pixel in the output image data is mapped to the polar coordinate pixel grid of the input space to obtain a plurality of discrete pixels mapped. According to the positions of the plurality of discrete pixels mapped in the polar coordinate pixel grid of the input space, in the polar coordinate pixel grid of the input space, adjacent pixels are selected for interpolation operation, and the interpolation weights are allocated according to the weight allocation scheme of bilinear interpolation, referring to equation (8).

Figure 5:
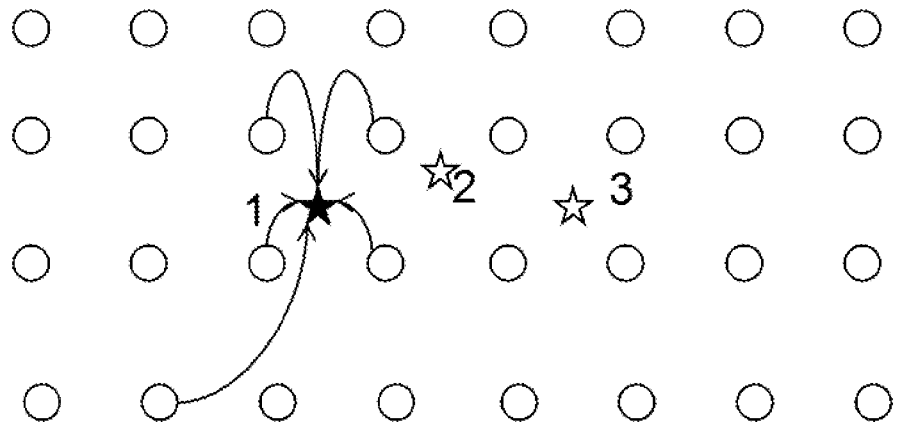
FIG. 5 is a schematic diagram of a mapping method from an output space to an input space in an embodiment of the present disclosure.

FIG. 5 is a schematic diagram of a mapping method from the output space to the input space in an embodiment of the present disclosure. As shown in FIG. 5, the circle represents the polar coordinate pixel grid of the input space, and the five-pointed stars represent a plurality of discrete pixels after the pixels in the output image data are mapped. In FIG. 5, numerals 1 to 3 respectively represent three different pixels in the output image data. In an embodiment, the polar coordinate pixel grid of the input space is non-uniform relative to the pixels in the output image data, and it is determined according to the relative relationships of the polar diameters and the polar angles that five pixels in the polar coordinate pixel grid of the input space have weight influence on one pixel (represented by a solid five-pointed star) of the output image data. In FIG. 5, the curve with an arrow indicates that the pixels in the input space allocates weights to the pixel in the output image data. When using the mapping method from the output space to the input space, the luminance components or chrominance components are shifted into corresponding polar coordinate positions, and the interpolation is performed according to the differences of the polar diameters and the polar angles shifted, the processing may be described through the following three steps.

A2: Generation of Polar Coordinate Pixel Grid

The implementation of this step is the same as that of step A1.

B2: GDC Mapping Pixel by Pixel

The GDC mapping may be performed by using the second mapping method described above. In an embodiment, the polar coordinate mapping from the output space to the input space is performed by using GDC parameters, when the polar coordinate mapping from the output space to the input space is performed, the polar angle information about each pixel is retained and the polar diameter information is corrected.

After the pixel values of all the pixels participating in the weight allocation of the interpolation operation are counted, an operation result is outputted according to equation (10):

$$x_{output} = \left(\sum_{j=1:N} x^j \text{weight}_j\right) \bigg/ \sum_{q=1:N} \text{weight}_q. \quad (10)$$

In equation (10), $x^j$ represents the $j^{th}$ pixel participating in interpolation, the value of j being 1 to N, N being an integer greater than 1; $\text{weight}_j$ represents the weight of the jth pixel participating in interpolation, $$\sum_{q=1:N} \text{weight}_q$$

represents the sum of weights of all pixels participating in interpolation, and $x_{output}$ represents an interpolation operation result.

Although the operation result obtained according to equation (10) is the same as that obtained according to equation (8), equation (10) reflects the polar coordinate mapping from the output space to the input space, which facilitates pipeline design in hardware design and reduces cache requirements.

C2: Pixel Interpolation in Polar Coordinate System

According to the description of the embodiments of the present disclosure, no matter which mapping method is adopted, the interpolation operation is performed for pixels. The interpolation method based on a polar coordinate system is characterized in that the weight design depends on the relative relationship of the polar coordinate space, and needs to meet the requirement that the weight of a point with a small distance is not less than that of a point with a large distance. Referring to the weight acquisition method in the Cartesian coordinate system, an implementation scheme is given as follows.

Based on the weight design of the linear relationship which is 2Tape in both horizontal direction and vertical direction, for the two pixels $(\rho_0,\theta_0)$ and $(\rho_1,\theta_1)$ in the polar coordinate system, when the polar diameters are the same $(\rho_0=\rho_1)$, the distance between the two pixels is dis=abs($\theta_0-\theta_1$)×$\rho_0$. When the polar angles are the same $(\theta_0=\theta_1)$, the distance between the two pixels is dis=abs($\rho_0-\rho_1$). When the polar diameters and the polar angles are both not equal, the distance between the two pixels is dis=abs($\theta_0-\theta_1$)×max($\rho_0$, $\rho_1$)+abs($\rho_0-\rho_1$). The sum DIS=dis$_i$ of distances between the plurality of pixels participating in interpolation and the pixel of which the pixel value needs to be obtained by interpolation operation, where dis$_i$ represents the distance between the ith pixels participating in interpolation and the pixel of which the pixel value needs to be obtained by interpolation operation, the weight of the pixel participating in interpolation may be expressed by equation (9).

In an embodiment, according to the GDC parameter difference of different color channels, steps B2 and C2 may be performed pixel by pixel for each color channel, such that the output results can suppress color distortion at the same time.

Embodiment IV

Based on some embodiments of the present disclosure, an example is given for illustration.

A coordinate grid of an input space and a coordinate grid of an output space are established for the display resolution of the VR device. Here, establishing a coordinate grid of an input space and a coordinate grid of an output space is the same as that in embodiment two of the present disclosure.

According to the first mapping method described above, pixels corresponding to a plurality of grids of the polar coordinate pixel grid of the input space may be mapped to obtain a plurality of discrete pixels mapped. According to the positions of the plurality of discrete pixels mapped in the polar coordinate grid of the output space, the weights are allocated according to the interpolation method based on the polar coordinate system (the polar coordinate interpolation weight allocation method based on Lanczos interpolation), and after the weights are allocated for the plurality of discrete pixels mapped, the interpolation operation results (i.e., pixel values) of the plurality of discrete pixels mapped are outputted in a weighted sum way.

In some embodiments of the present disclosure, the mapping method from the input space to the output space may be shown with reference to FIG. 4. FIG. 4 is already explained with Embodiment II of the present disclosure.

In some embodiments of the present disclosure, the presentation method for a VR device may be explained by the following three steps.

A3: Generation of Polar Coordinate Pixel Grid

The implementation of this step is the same as that of step A1.

B3: GDC Mapping Pixel by Pixel

The implementation of this step is the same as that of step B1.

C3: Pixel Interpolation in Polar Coordinate System

According to the description of the embodiments of the present disclosure, no matter which mapping method is adopted, interpolation operation is performed for pixels. The interpolation method based on a polar coordinate system is characterized in that the weight design depends on the relative relationship of the polar coordinate space, and needs to meet the requirement that the weight of a point with a small distance is not less than that of a point with a large distance. Referring to the weight acquisition method in the Cartesian coordinate system, an implementation scheme is given as follows.

The nonlinear interpolation weight design based on multiple Tape may refer to Lanczos interpolation for the case of a plurality of Tape. The pixel distance calculation method in step C1 or C2 is used, but the weight algorithm of Lanczos interpolation is adopted, that is, the distance between adjacent pixels in the Cartesian coordinate system is set to 1, the distance dis between pixels is zoomed-in in equal proportion according to the following equation: dis2=dis×Q, where Q represents a zooming-in factor, and dis2 represents a zooming-in result. The initial weight of each pixel is calculated according to equation (11):

$$\text{weight\_origin}=\text{sinc}(\text{dis2})/\text{sinc}(\text{dis2}\times N) \quad (11)$$

In equation (11) weight_origin represents the initial weight of a pixel, N represents the number of pixels participating in interpolation, that is, the Tape number.

After the initial weight of each pixel is calculated, each pixel participating in interpolation is calculated according to equation (12) and then is re-normalized.

$$PixelOutput(\rho_1, \theta_0) = \frac{\text{weight\_origin}_{i,j} \times PixelInput(\rho_i, \theta_j)}{\sum_{i,j} \text{weight\_origin}_{i,j}} \quad (12)$$

In equation (12), $(\rho_1,\theta_0)$ represents the coordinates of the pixel of which the pixel value needs to be obtained by interpolation operation, $PixelOutput(\rho_1,\theta_0)$ represents the pixel value of the pixel of which the coordinates are $(\rho_1,\theta_0)$, $(\rho_i,\theta_j)$ represents the coordinates of the pixels in the neighborhood of the pixel of which the coordinates are $(\rho_1,\theta_0)$, weight_origin$_{i,j}$ represents the initial weight of the pixel of which the coordinates are $(\rho_i,\theta_j)$, and $PixelInput(\rho_i,\theta_j))$ represents the pixel value of the pixel of which the coordinates are $(\rho_i,\theta_j)$.

In an embodiment, according to the GDC parameter difference of different color channels, steps B3 and C3 may be performed pixel by pixel for each color channel, such that the output results can suppress color distortion at the same time.

Embodiment V

Based on some embodiments of the present disclosure, an example is given for illustration.

A coordinate grid of the input space and a coordinate grid of the output space are established for the display resolution of the VR device. The coordinate grid of the input space and the coordinate grid of the output space are represented by polar coordinates with a polar diameter in the range of [0, 1] and a polar angle in the range of [0, 2π]. For the HMD, a display resolution (i.e. output resolution) is fixed usually. Therefore, two LUTs may be provided to establish the coordinate grid of the input space and the coordinate grid of the output space respectively. Exemplarily, the coordinates of each LUT represent x, y coordinates of the Cartesian coordinate system, and the values represent polar diameters or polar angles.

According to the second mapping method described above, and according to the inverse mapping of the specific mapping mode (i.e., the image zooming-in mapping mode of the convex lens), a plurality of pixels in the image corresponding to the output image data are mapped to the polar coordinate pixel grid of the input space respectively to obtain a plurality of discrete pixels mapped; according to the positions of the plurality of discrete pixels after mapping in the polar coordinate pixel grid of the input space, in the polar coordinate pixel grid of the input space, adjacent pixels are selected for interpolation operation, and the interpolation weights are allocated according to the weight allocation scheme of Lanczos interpolation, referring to equation (11) and equation (12).

In some embodiments of the present disclosure, the mapping method from the output space to the input space may be shown with reference to FIG. 4. FIG. 5 is already described with Embodiment III of the present disclosure.

In some embodiments of the present disclosure, the presentation method for a VR device may be described by the following steps.

A4: Generation of Polar Coordinate Pixel Grid

The implementation of this step is the same as that of step A1.

B4: GDC Mapping Pixel by Pixel

The implementation of this step is the same as that of step B2.

C4: Pixel Interpolation in Polar Coordinate System

The implementation of this step is the same as that of step C3.

Embodiment VI

Based on the method for presenting image for a VR device proposed in the foregoing embodiments of the present disclosure, in the embodiment of the present disclosure proposed is an apparatus for presenting image for a VR device, which may be applicable to the VR device.

Figure 6:
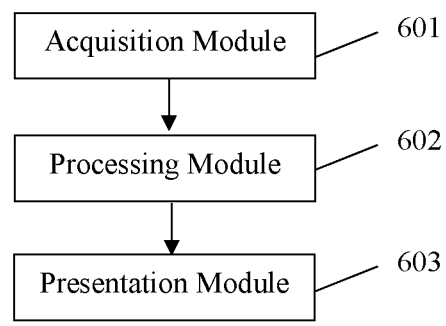
FIG. 6 is a structural schematic diagram of an apparatus for presenting image for a VR device according to an embodiment of the present disclosure.

FIG. 6 is a structural schematic diagram of an apparatus for presenting image for a VR device according to an embodiment of the present disclosure. As shown in FIG. 6, the apparatus includes an acquisition module 601, a processing module 602 and a presentation module 603.

The acquisition module 601 is configured to acquire input image data.

The processing module 602 is configured to establish a correspondence between the input image data and output image data in a polar coordinate system, and obtain, according to the output image data, image data to be presented, the polar coordinate system has pole which is an intersection of the center of the field of view of the VR device and a display plane.

The presentation module 603 is configured to present the image data to be presented on the basis of a convex lens.

In an embodiment, the processing module 602 is further configured to convert coordinates of each of a plurality of pixels in the input image data from the Cartesian coordinate system to the polar coordinate system according to the display resolution of the VR device before establishing a correspondence between the input image data and output image data.

In an embodiment, the processing module 602 is configured to acquire the pre-determined LUTs respectively corresponding to a plurality of display resolutions, and convert the coordinates of each of the plurality of pixels in the input image data respectively from the Cartesian coordinate system to the polar coordinate system according to the display resolutions of the VR device and the coordinate system conversion tables respectively corresponding to the plurality of display resolutions. The coordinate system conversion tables ae configured to represent the coordinate mapping relationships of the plurality of pixels in the image from the Cartesian coordinate system to the polar coordinate system respectively.

In an embodiment, the processing module 602 is configured to determine pixel values of a plurality of pixels in the output image data, and generate the image data to be presented according to the coordinates and pixel values of the plurality of pixels in the output image data.

In an embodiment, the processing module 602 is configured to:
  generate a polar coordinate pixel grid of the input space for the input image data, where each of a plurality of grids in the polar coordinate pixel grid of the input space corresponds to a respective one of the plurality of pixel in the input image data;
  map the pixels corresponding to the plurality of grids of the polar coordinate pixel grid of the input space, in a mapping mode from the input image data to the output image data, to obtain a plurality of discrete pixels mapped; generate a polar coordinate pixel grid of the output space according to the plurality of discrete pixels mapped, where each grid in the polar coordinate pixel grid of the output space corresponds to one of the plurality of discrete pixels mapped; and
  when a pixel in the image corresponding to the output image data is not included in the plurality of pixels in the polar coordinate pixel grid of the output space, determine a neighborhood of the pixel that does not belong to the polar coordinate pixel grid of the output space, according to the polar coordinate pixel grid of the output space; perform interpolation operation according to the pixel values of a plurality of pixels in the neighborhood of the pixel to obtain the pixel value of the pixel.

In an embodiment, the processing module 602 is configured to:
  generate a polar coordinate pixel grid of the input space for the input image data, where each of the plurality of grids in the polar coordinate pixel grid of the input space corresponds to a respective one of the plurality of pixel in the input image data;
  map a plurality of pixels in the image corresponding to the output image data to the polar coordinate pixel grid of the input space, according to the mapping mode from the output image data to the input image data, to obtain a plurality of discrete pixels after mapping;
  when a pixel of the plurality of discrete pixels mapped is not included in the pixels in the polar coordinate pixel grid of the input space, determine a neighborhood of the pixel which does not belong to the polar coordinate pixel grid of the input space, according to the polar coordinate pixel grid of the input space; perform interpolation operation according to pixel values of a plurality of pixels in the neighborhood of the pixel to obtain the pixel value of the pixel; and
  obtain the pixel values of the plurality of pixels of the output image data according to the pixel values of the plurality of discrete pixels after mapping.

In an embodiment, the processing module 602 is configured to perform interpolation operation using a bilinear interpolation method, a trilinear interpolation method or a Lanczos interpolation method according to the pixel values of the plurality of pixels in the neighborhood of the pixel.

In an embodiment, the pixel values are used to represent luminance components or chrominance components of pixels.

In one embodiment, the processing module 602 is further configured to remove the area where the plurality of pixels in the image corresponding to the output image data are located from the area where the plurality of pixels in the image corresponding to the input image data are located, to obtain an edge pixel area; set the pixel values of a plurality of pixels in the edge pixel area to zero, and generate the image data to be presented according to the coordinates and pixel values of the plurality of pixels in the output image data and the coordinates and pixel values of the plurality of pixels in the edge pixel area.

In a practical application, each of the acquisition module 601 and the processing module 602 may be implemented by a Central Processing Unit (CPU), a Micro Processor Unit (MPU), a Digital Signal Processor (DSP) or a Field Programmable Gate Array (FPGA), etc., which is located in the VR device. The presentation module 603 may be implemented by the CPU, MPU, DSP or FPGA located in the VR device in combination with a hardware device located at the data presentation end of the VR device.

In addition, in an embodiment of the present disclosure, a plurality of functional units may be integrated into one processing unit, or each of the units may exist alone physically, or two or more units are integrated into one unit. The above-mentioned integrated unit can be implemented in the form of hardware or software functional module.

If implemented in the form of a software functional module, and sold or used as an independent product, the integrated unit can be stored in a computer readable storage medium. The technical scheme of the embodiment essentially, or the part that contributes to the existing technology, or all or part of the technical scheme, can be embodied in the form of a software product. The computer software product is stored in a storage medium, and includes a plurality of instructions for instructing a computer device (which may be a personal computer, a server, a network device, and the like) to perform all or part of the steps of the method described in the embodiments. The storage medium includes: various media that can store program codes, such as USB flash disks, removable hard disks, ROMs, RAMs, magnetic disks, or optical disks.

Computer program instructions corresponding to the method in the embodiments of the present disclosure can be stored on storage medium, such as optical disks, hard disks, USB flash drives, and the like. The computer program instructions corresponding to the method in the storage medium, when read or executed by an electronic device, implement one of the methods in the foregoing embodiments.

Figure 7:
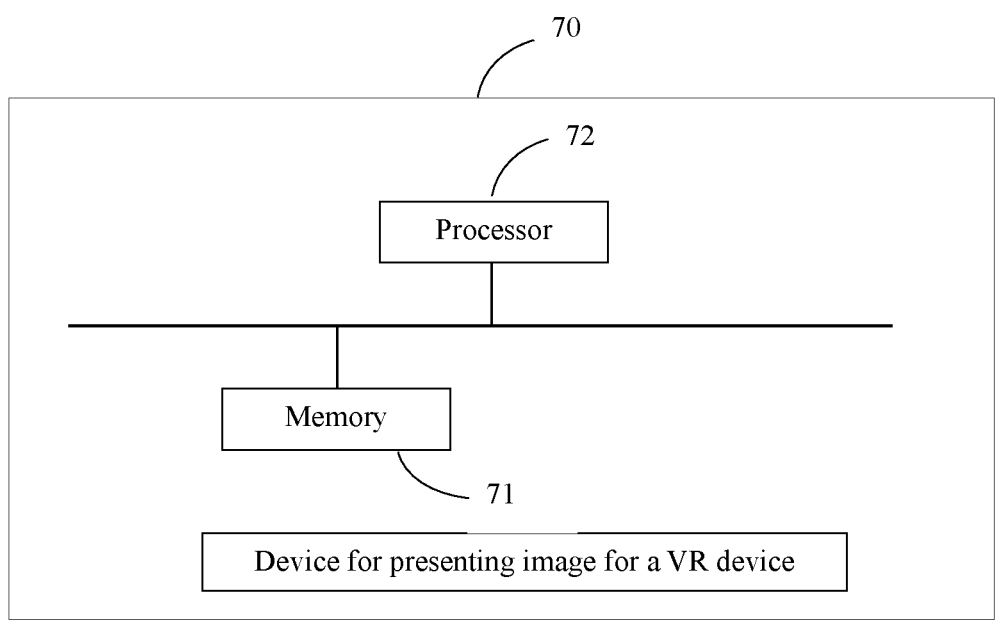
FIG. 7 is a structural schematic diagram of a device for presenting image for a VR device according to an embodiment of the present disclosure.

FIG. 7 shows an image presentation device 70 for a VR device provided by an embodiment of the present disclosure. The device may include a memory 71 and a processor 72.

The memory 71 is configured to store computer program and data.

The processor 72 is configured to execute the computer program stored in the memory to implement one of the methods described in the embodiments.

In a practical application, the memory 71 may be a volatile memory, such as RAM; or a non-volatile memory, such as ROM, flash memory, Hard Disk Drive (HDD) or Solid-State Drive (SSD); or a combination of the above memories, and provides instructions and data for the processor 72.

The processor 72 may be at least one selected from a group consisting of ASIC, DSP, DSPD, PLD, FPGA, CPU, controller, microcontroller and microprocessor. In an embodiment, for different devices, an electronic device used to implement the above-mentioned processor functions may also be other devices, which are not specifically limited in the embodiment of the present disclosure.

Embodiment VII

In some embodiments of the present disclosure further proposed is a VR device. The VR device includes an apparatus for presenting image for a VR device or a device for presenting image for a VR device in the embodiments of the present disclosure, and further includes a source generation end and a data processing end.

In the embodiments of the present disclosure methods, systems, or computer program products may be provided. Accordingly, the present disclosure may be implemented in the form of hardware, software, or a combination of software and hardware. Moreover, the present disclosure may be implemented in the form of a computer program product containing computer-usable program code stored on a non-transitory computer-usable storage medium (including magnetic disk storage, optical storage, and the like).

The present disclosure is described with reference to flowcharts and/or block diagrams of the methods, devices (systems), and computer program products according to the embodiments of the present disclosure. Each flow and/or block in the flow and/or block diagram and a combination of the flow and/or block in the flow and/or block diagram may be implemented by computer program instructions. These computer program instructions may be provided to a processor of a general-purpose computer, a special purpose computer, an embedded processor, or other programmable data processing devices to generate a machine, such that instructions executed by the processor of the computer or other programmable data processing devices generate means for implementing the functions specified in one or more of the flow charts and/or one or more of the block diagrams.

These computer program instructions may also be stored in a computer-readable memory capable of directing a computer or other programmable data processing devices to operate in a particular manner such that the instructions stored in the computer-readable memory produce articles of manufacture comprising instruction apparatus that implement functions specified in one or more of the flow charts and/or in one or more of the block diagrams.

These computer program instructions may also be loaded into a computer or other programmable data processing devices, such that a series of operational steps are performed on the computer or other programmable devices to generate computer-implemented processing, such that the instructions executed on the computer or other programmable devices provide steps for implementing the functions specified in one or more of the flow charts and/or the block diagrams.

What is claimed is:

1. A method for presenting image for a VR device, comprising steps of:
    acquiring input image data;
    establishing a correspondence between the input image data and output image data in a polar coordinate system, the polar coordinate system having a pole which is an intersection of a center of a field of view of the VR device and a display plane;
    obtaining, in the polar coordinate system, image data to be presented in the polar coordinate system according to the output image data; and
    presenting the image data to be presented on the basis of a convex lens.

2. The method of claim 1, prior to the step of establishing a correspondence between the input image data and output image data, further comprising a step of:
    converting coordinates of a plurality of pixels in the input image data from a Cartesian coordinate system to the polar coordinate system according to a display resolution of the VR device.

3. The method of claim 2, wherein the step of converting coordinates of a plurality of pixels in the input image data from a Cartesian coordinate system to the polar coordinate system according to a display resolution of the VR device comprises steps of:
    acquiring pre-determined coordinate system conversion tables respectively corresponding to a plurality of display resolutions, for representing coordinate mapping relationships of the plurality of pixels in an image from the Cartesian coordinate system to the polar coordinate system, respectively; and
    converting the coordinates of the plurality of pixels in the input image data from the Cartesian coordinate system to the polar coordinate system according to the display resolution of the VR device and the coordinate system conversion tables corresponding to the plurality of display resolutions respectively.

4. The method of claim 1, wherein the step of obtaining, in the polar coordinate system, the image data to be presented in the polar coordinate system according to the output image data comprises steps of:
    determining pixel values of a plurality of pixels in the output image data; and
    generating the image data to be presented according to coordinates and the pixel values of the plurality of pixels in the output image data.

5. The method of claim 4, wherein the step of determining pixel values of a plurality of pixels in the output image data comprises steps of:
    generating a polar coordinate pixel grid of an input space for the input image data, each of a plurality of grids in the polar coordinate pixel grid of the input space corresponding to respective one of the plurality of pixels in the input image data;
    mapping the pixels corresponding to the plurality of grids of the polar coordinate pixel grid of the input space, in a mapping mode from the input image data to the output image data, to obtain a plurality of discrete pixels mapped; generating the polar coordinate pixel grid of the output space according to the plurality of discrete pixels mapped, each grid in the polar coordinate pixel grid of the output space corresponding to a respective one of the plurality of discrete pixels mapped; and
    while a pixel in an image corresponding to the output image data is excluded from the pixels in the polar coordinate pixel grid of the output space, determining a neighborhood of the pixel that does not belong to the polar coordinate pixel grid of the output space, according to the polar coordinate pixel grid of the output space; performing interpolation operation on the pixel values of a plurality of pixels in the neighborhood of the pixel to obtain the pixel value of the pixel.

6. The method of claim 5, wherein the step of performing interpolation operation on the pixel values of a plurality of pixels in the neighborhood of the pixel comprises a step of:
performing the interpolation operation using a bilinear interpolation method, a trilinear interpolation method or a Lanczos interpolation method on the pixel values of the plurality of pixels in the neighborhood of the pixel.

7. The method of claim 4, wherein the step of determining pixel values of a plurality of pixels in the output image data comprises steps of:
generating a polar coordinate pixel grid of the input space for the input image data, each of the plurality of grids in the polar coordinate pixel grid of the input space corresponding to one of the pixels in the input image data;
mapping the plurality of pixels in the image corresponding to the output image data to the polar coordinate pixel grid of the input space, according to a mapping mode from the output image data to the input image data, to obtain a plurality of discrete pixels mapped;
while a pixel of the plurality of discrete pixels mapped is excluded from the pixels in the polar coordinate pixel grid of the input space, determining a neighborhood of the pixel which does not belong to the polar coordinate pixel grid of the input space, according to the polar coordinate pixel grid of the input space; performing interpolation operation on the pixel values of a plurality of pixels in the neighborhood of the pixel to obtain the pixel value of the pixel; and
obtaining the pixel values of the plurality of pixels in the output image data according to the pixel values of the plurality of discrete pixels mapped.

8. The method of claim 4, wherein the pixel values are used to represent luminance components or chrominance components of pixels.

9. The method of claim 4, wherein the step of generating the image data to be presented according to coordinates and the pixel values of the plurality of pixels in the output image data comprises:
removing an area where the plurality of pixels in the image corresponding to the output image data are located from the area where the plurality of pixels in the image corresponding to the input image data are located, to obtain an edge pixel area; and
setting the pixel values of a plurality of pixels in the edge pixel area to zero, and generating the image data to be presented according to the coordinates and pixel values of the plurality of pixels in the output image data, and the coordinates and pixel values of the plurality of pixels in the edge pixel area.

10. A non-transitory computer-readable storage medium storing a computer program which, when executed by a processor, causes the processor to perform the method of claim 1.

11. An apparatus for presenting image for a VR device, comprising:
an acquisition module, configured to acquire input image data;
a processing module, configured to establish a correspondence between the input image data and output image data in a polar coordinate system, and obtain, in the polar coordinate system, image data to be presented in the polar coordinate system according to the output image data, the polar coordinate system having a pole which is an intersection of a center of a field of view of the VR device and a display plane; and
a presentation module, configured to present the image data to be presented on the basis of a convex lens.

12. A VR device, comprising the apparatus of claim 11, a source generation end, and a data processing end.

13. A device for presenting image for a VR device, comprising a processor and a memory for storing a computer program executable by the processor, wherein the computer program, when executed by the processor, causes the processor to perform a method comprising steps of:
acquiring input image data;
establishing a correspondence between the input image data and output image data in a polar coordinate system, the polar coordinate system having a pole which is an intersection of a center of a field of view of the VR device and a display plane;
obtaining, in the polar coordinate system, image data to be presented in the polar coordinate system according to the output image data; and
presenting the image data to be presented on the basis of a convex lens.

* * * * *